US012689916B2

(12) United States Patent　　　(10) Patent No.:　US 12,689,916 B2
Kotagiri et al.　　　　　　　　　　(45) Date of Patent:　　　Jul. 21, 2026

(54) BASE STATION, APPARATUS, METHOD AND COMPUTER READABLE MEDIUM FOR MIXED-NUMEROLOGY CONFIGURATION SELECTION

(71) Applicant: NEC Corporation, Tokyo (JP)

(72) Inventors: Dheeraj Kotagiri, Tokyo (JP); Anan Sawabe, Tokyo (JP); Eiji Takahashi, Tokyo (JP); Takanori Iwai, Tokyo (JP)

(73) Assignee: NEC CORPORATION, Tokyo (JP)

( * ) Notice:　Subject to any disclaimer, the term of this patent is extended or adjusted under 35 U.S.C. 154(b) by 298 days.

(21) Appl. No.:　18/562,507

(22) PCT Filed:　May 26, 2021

(86) PCT No.:　PCT/JP2021/020016
§ 371 (c)(1),
(2) Date:　Nov. 20, 2023

(87) PCT Pub. No.: WO2022/249342
PCT Pub. Date: Dec. 1, 2022

(65)　　　　Prior Publication Data
US 2024/0244456 A1　　Jul. 18, 2024

(51) Int. Cl.
*H04W 24/02*　　(2009.01)
*H04L 27/26*　　(2006.01)
*H04W 24/10*　　(2009.01)

(52) U.S. Cl.
CPC ....... *H04W 24/02* (2013.01); *H04L 27/26025* (2021.01); *H04W 24/10* (2013.01)

(58) Field of Classification Search
CPC .. H04W 24/02; H04W 24/10; H04L 27/26025
See application file for complete search history.

(56)　　　　References Cited

U.S. PATENT DOCUMENTS

| | | | |
|---|---|---|---|
| 10,728,268 B1 * | 7/2020 | Hagen | H04L 63/0227 |
| 12,250,044 B2 * | 3/2025 | Vankayala | G06N 3/0495 |
| 2019/0052597 A1 * | 2/2019 | Raghunath | H04L 61/5007 |

(Continued)

FOREIGN PATENT DOCUMENTS

| | | |
|---|---|---|
| JP | 2019-535185 A | 12/2019 |
| WO | 2018/149165 A1 | 8/2018 |
| WO | 2018/166607 A1 | 9/2018 |

OTHER PUBLICATIONS

JP Office Action for JP Application No. 2023-568601, mailed on Nov. 26, 2024 with English Translation.

(Continued)

*Primary Examiner* — Melanie Jagannathan
(74) *Attorney, Agent, or Firm* — Sughrue Mion, PLLC

(57)　　　　ABSTRACT

The requirement feature extractor extracts statistical features related to service requirements of UEs. The traffic feature extractor extracts statistical features related to incoming and outgoing traffic. The channel feature extractor extracts statistical features related to a wireless channel condition and a wireless channel configuration. The context unit generate a context vector based on the statistical features. The ML model array estimates QoS for mixed-numerology configurations based on the context vector. The decision unit selects a mixed-numerology configuration used for data transmission and data reception based on the estimated QoS.

20 Claims, 10 Drawing Sheets

(56)         References Cited

U.S. PATENT DOCUMENTS

| | | | |
|---|---|---|---|
| 2020/0052757 A1* | 2/2020 | Wang | H04W 24/02 |
| 2020/0153694 A1* | 5/2020 | Savalle | H04W 4/50 |
| 2020/0296741 A1* | 9/2020 | Ayala Romero | H04W 72/535 |
| 2020/0322222 A1* | 10/2020 | Manolakos | H04L 1/0001 |
| 2020/0358187 A1* | 11/2020 | Tran | G06N 3/082 |
| 2021/0127306 A1* | 4/2021 | Cui | H04W 28/06 |
| 2022/0038332 A1* | 2/2022 | Umakanth | H04L 41/5016 |
| 2022/0182208 A1* | 6/2022 | Yu | H04L 5/0053 |
| 2022/0271851 A1* | 8/2022 | Prasad | G06N 3/09 |
| 2022/0377751 A1* | 11/2022 | Kotaru | H04L 5/0057 |
| 2023/0092704 A1* | 3/2023 | Zhang | H04L 5/0098 |
| | | | 370/329 |
| 2023/0291623 A1* | 9/2023 | Memisoglu | H04L 27/2614 |
| 2023/0319805 A1* | 10/2023 | Vankayala | G06N 3/084 |
| | | | 370/329 |
| 2024/0129056 A1* | 4/2024 | Xing | H04L 5/0007 |
| 2024/0172283 A1* | 5/2024 | Alabbasi | G06N 3/092 |
| 2024/0187127 A1* | 6/2024 | Narayanan Thangaraj | |
| | | | H04L 5/0055 |

OTHER PUBLICATIONS

International Search Report for PCT Application No. PCT/JP2021/020016, mailed on Feb. 22, 2022.

A. Yazar and H. Arslan, "A Flexibility Metric and Optimization Methods for Mixed Numerologies in 5G and Beyond," in IEEE Access, vol. 6, 2018, doi: 10.1109/ACCESS.2018.2795752, pp. 3577-3764.

Zambianco Marco et al: "Spectrum Allocation for Network Slices with Inter-Numerology Interference using Deep Reinforcement Learning", 2020 IEEE 31st Annual International Symposium on Personal, Indoor and Mobile Radio Communications, IEEE, Aug. 31, 2020 (Aug. 31, 2020), pp. 1-7.

Tang Chao et al: "Dynamic Resource Optimization Based on Flexible Numerology and Markov Decision Process for Heterogeneous Services", 2019 IEEE 25th International Conference on Parallel and Distributed Systems (ICPADS), IEEE, Dec. 4, 2019 (Dec. 4, 2019), pp. 610-617.

Marijanovic Ljiljana et al: "Multiplexing Services in 5G and Beyond: Optimal Resource Allocation Based on Mixed Numerology and Mini-Slots", IEEE Access, IEEE, USA, vol. 8, Nov. 19, 2020 (Nov. 19, 2020), pp. 209537-209555.

Marijanovic Ljiljana et al: "Optimal Resource Allocation with Flexible Numerology", 2018 IEEE International Conference on Communication Systems (ICCS), IEEE, Dec. 19, 2018 (Dec. 19, 2018), pp. 136-141.

* cited by examiner

| Frequency Range | μ | Carrier Spacing Δf (kHz) | $T_{CP}$(μs) | Slot Duration (ms) | Maximum Bandwidth (MHz) |
|---|---|---|---|---|---|
| FR-1 | 0 | 15 | 4.76 | 1 | 50 |
| | 1 | 30 | 2.38 | 0.5 | 100 |
| | 2 | 60 | 1.19 \| 4.17 | 0.25 | 100 |
| FR-2 | 3 | 120 | 1.19 \| 4.17 | 0.25 | 200 |
| | 4 | 240 | 0.6 | 0.125 | 400 |

| 5QI Value | Resource Type | Default Priority Level | Packet Delay Budget | Packet Error Rate | Default Averaging Window | Example Services |
|---|---|---|---|---|---|---|
| 1 | GBR | 20 | 100 ms | $10^{-2}$ | 2000 ms | Conversational Voice |
| 2 | GBR | 40 | 150 ms | $10^{-3}$ | 2000 ms | Conversational Video (Live Streaming) |
| 3 | GBR | 30 | 50 ms | $10^{-3}$ | 2000 ms | Real Time Gaming, V2X messages; Electricity distribution – medium voltage, Process automation – monitoring |
| 4 | GBR | 50 | 300 ms | $10^{-6}$ | 2000 ms | Non-Conversational Video (Buffered Streaming) |
| 65 | GBR | 7 | 75 ms | $10^{-2}$ | 2000 ms | Mission Critical user plane Push To Talk voice (e.g., MCPTT) |
| 66 | GBR | 20 | 100 ms | $10^{-2}$ | 2000 ms | Non-Mission-Critical user plane Push To Talk voice |
| 67 | GBR | 15 | 100 ms | $10^{-3}$ | 2000 ms | Mission Critical Video user plane |
| 71 | GBR | 56 | 150 ms | $10^{-6}$ | 2000 ms | "Live" Uplink Streaming |
| 72 | GBR | 56 | 300 ms | $10^{-4}$ | 2000 ms | "Live" Uplink Streaming |
| 5 | Non-GBR | 10 | 100 ms | $10^{-6}$ | N/A | IMS Signalling |
| 6 | Non-GBR | 60 | 300 ms | $10^{-6}$ | N/A | Video (Buffered Streaming) TCP-based (e.g., www, e-mail, chat, ftp, p2p file sharing, progressive video, etc.) |
| 8 | Non-GBR | 80 | 300 ms | $10^{-6}$ | N/A | Video (Buffered Streaming) TCP-based (e.g., www, e-mail, chat, ftp, p2p file sharing, progressive video, etc.) |
| 9 | Non-GBR | 90 | 300 ms | $10^{-6}$ | N/A | Video (Buffered Streaming) TCP-based (e.g., www, e-mail, chat, ftp, p2p file sharing, progressive video, etc.) |
| 69 | Non-GBR | 5 | 60 ms | $10^{-6}$ | N/A | Mission Critical delay sensitive signalling (e.g., MC-PTT signalling) |
| 70 | Non-GBR | 55 | 200 ms | $10^{-6}$ | N/A | Mission Critical Data (e.g. example services are the same as 5QI 6/8/9) |
| 79 | Non-GBR | 65 | 50 ms | $10^{-2}$ | N/A | V2X messages |
| 80 | Non-GBR | 68 | 10 ms | $10^{-6}$ | N/A | Low Latency eMBB applications Augmented Reality |
| 82 | Delay Critical GBR | 19 | 10 ms | $10^{-4}$ | 2000 ms | Discrete Automation |
| 84 | Delay Critical GBR | 24 | 30 ms | $10^{-5}$ | 2000 ms | Intelligent transport systems |
| 85 | Delay Critical GBR | 21 | 5 ms | $10^{-5}$ | 2000 ms | Electricity Distribution- high voltage |

Fig. 6

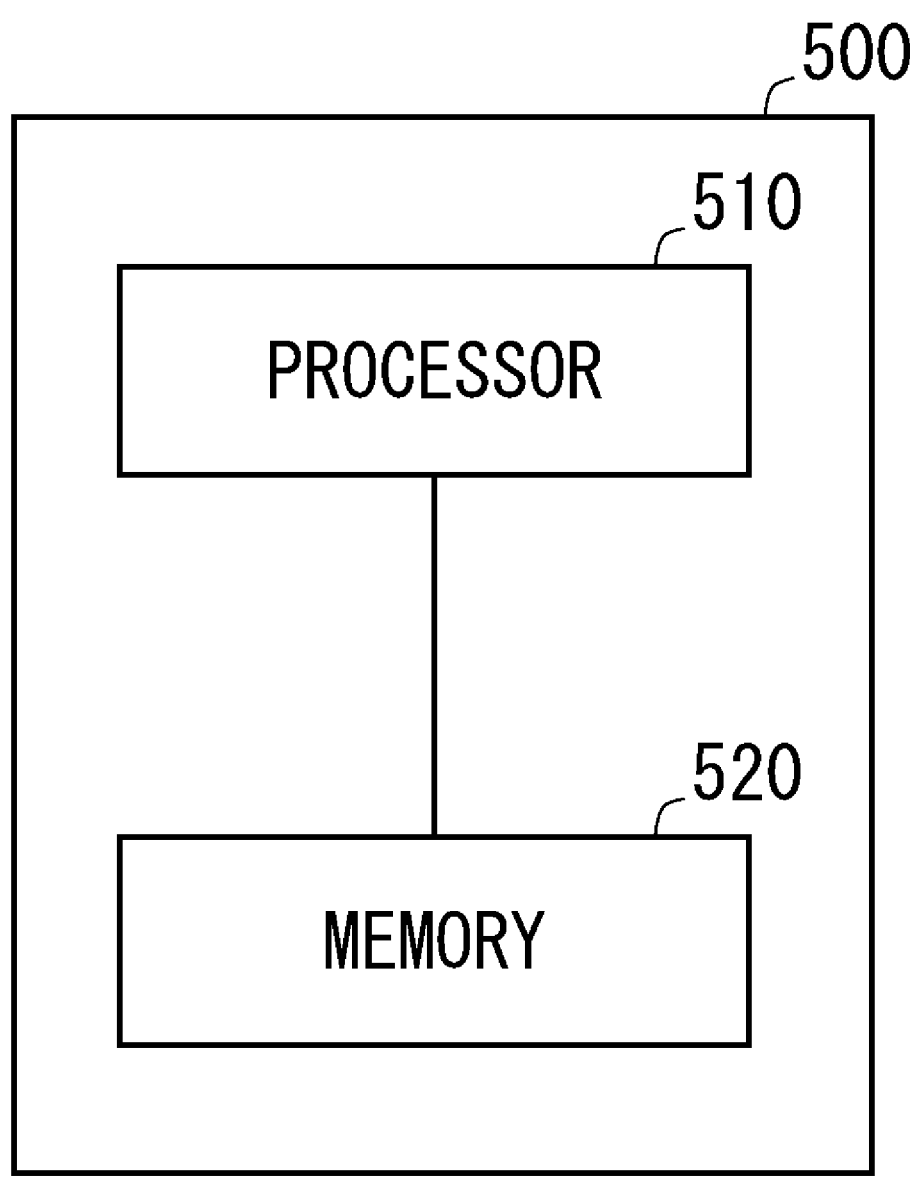
F i g .  1 0

BASE STATION, APPARATUS, METHOD AND COMPUTER READABLE MEDIUM FOR MIXED-NUMEROLOGY CONFIGURATION SELECTION

This application is a National Stage Entry of PCT/JP2021/020016 filed on May 26, 2021, the contents of all of which are incorporated herein by reference, in their entirety.

TECHNICAL FIELD

The present disclosure relates to a base station, an apparatus, a method, and a computer readable medium for mixed-numerology configuration selection.

BACKGROUND ART

Mixed numerology communication has been proposed because a fixed numerology system is not flexible enough to accommodate the varied requirements (e.g. latency, error rate, or the like) of a multitude of devices that may need to share the spectrum. For example, Internet of Things (IOT) devices such as sensors and autonomous vehicles have completely different requirements regarding packet error tolerance and latency, and thus cannot be managed by a fixed numerology system. If devices having mutually different requirements use the same numerology, the Quality of Service (QOS) experienced by end users may be reduced.

A method such as a greedy algorithm have been proposed to improve the network flexibility (NPL 1). Further, a low computational complexity method using a look-up table approach has been proposed to provide a feasible set of mixed-numerology configuration (PTL 1). Other approaches such as estimating Doppler spread to select a mixed-numerology configuration have been proposed (PTL2). Each associated User Equipment (UE) transmits mobility information separately using onboard sensors.

CITATION LIST

Patent Literature

PTL 1: Patent Application Number WO 2018/149165 A1
PTL 2: Patent Application Number WO 2018/166607 A1

Non Patent Literature

NPL 1: A. Yazar and H. Arslan, "A Flexibility Metric and Optimization Methods for Mixed Numerologies in 5G and Beyond," in IEEE Access, vol. 6, pp. 3755-3764, 2018, doi: 10.1109/ACCESS.2018.2795752.

SUMMARY OF INVENTION

Technical Problem

Notwithstanding the method disclosed in PTL 1, this method reduces the search space of possible mixed-numerology configurations. While this is useful, PTL1 doesn't provide a method to identify an optimal mixed-numerology configuration within the feasible set.

The mobility information method disclosed in PTL 2 mitigates the adverse effects of Doppler spreading. However, this method requires mobility information to be periodically transmitted from each UE to the next Generation NodeB (gNB) thereby adding significant overhead on the network. Further, PTL 2 doesn't take service requirements of non-mobile UEs into account.

The greedy algorithm disclosed in NPL 1 uses brute force to compute network flexibility for all possible mixed-numerology configurations. While it is theoretically possible but is practically not scalable as computational complexity increases exponentially with the number of UEs. Hence, this method is not suitable for dense wireless networks.

Accordingly, an example object of the present disclosure is to achieve high QoS for wireless networks with UEs having diverse service requirements without adding any additional overhead.

Solution to Problem

In order to achieve the above example object, the present disclosure provides, in a first aspect, an apparatus for mixed-numerology configuration selection. The apparatus includes:

a requirement feature extractor configured to extract statistical features related to service requirements of UEs associated with a base station; a traffic feature extractor configured to extract statistical features related to incoming and outgoing traffic of the base station;

a channel feature extractor configured to extract statistical features related to a wireless channel condition and a wireless channel configuration;

a context unit configured to generate a context vector based on the statistical features related to the service requirements, the statistical features related to the incoming and outgoing traffic, and the statistical features related to the wireless channel condition and the wireless channel configuration;

a first Machine Learning (ML) model array including a plurality of ML Models, each of the ML models being configured to estimate Quality of Service (QOS) for a mixed-numerology configuration based on the context vector generated by the context unit; and a decision unit configured to select a mixed-numerology configuration to be used for data transmission and data reception based on the Qos estimated by the ML models.

The present disclosure provides, in a second aspect, a base station. The base station includes a communication unit configured to communicate with a core network and UEs, and a mixed-numerology configuration selection unit configured to select a mixed-numerology configuration to be used for data transmission and data reception. The mixed-numerology configuration selection unit includes:

a requirement feature extractor configured to extract statistical features related to service requirements of the UEs;

a traffic feature extractor configured to extract statistical features related to incoming and outgoing traffic of the base station;

a channel feature extractor configured to extract statistical features related to a wireless channel condition and a wireless channel configuration;

a context unit configured to generate a context vector based on the statistical features related to the service requirements, the statistical features related to the incoming and outgoing traffic, and the statistical features related to the wireless channel condition and the wireless channel configuration;

a first Machine Learning (ML) model array including a plurality of ML Models, each of the ML models being configured to estimate Quality of Service (QOS) for a mixed-numerology configuration based on the context vector generated by the context unit; and a decision unit configured to select a mixed-numerology configuration to be used for data transmission and data reception based on the Qos estimated by the ML models.

The present disclosure provides, in a third aspect, a method for mixed-numerology configuration selection. The method includes:

extracting statistical features related to service requirements of UEs associated with a base station, extracting statistical features related to incoming and outgoing traffic of the base station, extracting statistical features related to a wireless channel condition and a wireless channel configuration, generating a context vector based on the statistical features related to the service requirements, the statistical features related to the incoming and outgoing traffic, and the statistical features related to the wireless channel condition and the wireless channel configuration, estimating Quality of Service (QOS) for mixed-numerology configurations based on the context vector using a Machine Learning (ML) model array including a plurality of ML Models, each of the ML models being configured to estimate QoS for a mixed-numerology configuration, and selecting a mixed-numerology configuration to be used for data transmission and data reception based on the QOS estimated by the ML models.

The present disclosure provide, in a fourth aspect, a non-transitory computer readable medium for mixed-numerology configuration selection. The non-transitory computer readable medium stores a program for a causing a computer to:

extract statistical features related to service requirements of UEs associated with a base station, extract statistical features related to incoming and outgoing traffic of the base station, extract statistical features related to a wireless channel condition and a wireless channel configuration, generate a context vector based on the statistical features related to the service requirements, the statistical features related to the incoming and outgoing traffic, and the statistical features related to the wireless channel condition and the wireless channel configuration, input the context vector to a Machine Learning (ML) model array including a plurality of ML Models, each of the ML models being configured to estimate Quality of Service (QOS) for a mixed-numerology configuration, to cause the ML models to estimate the Qos, select a mixed-numerology configuration to be used for data transmission and data reception based on the QoS estimated by the ML models.

Advantageous Effects of Invention

A base station, an apparatus, a method, and a computer readable medium for mixed-numerology configuration selection can achieve high QoS for wireless networks with UEs having diverse service requirements without adding any additional overhead.

BRIEF DESCRIPTION OF DRAWINGS

FIG. 6 is a diagram showing a table listing the performance and resource type requirements of services with different 5QI value.

FIG. 10 is a block diagram showing an example of a configuration of a computer device.

DESCRIPTION OF EMBODIMENTS

<Outline>

Figure 1:
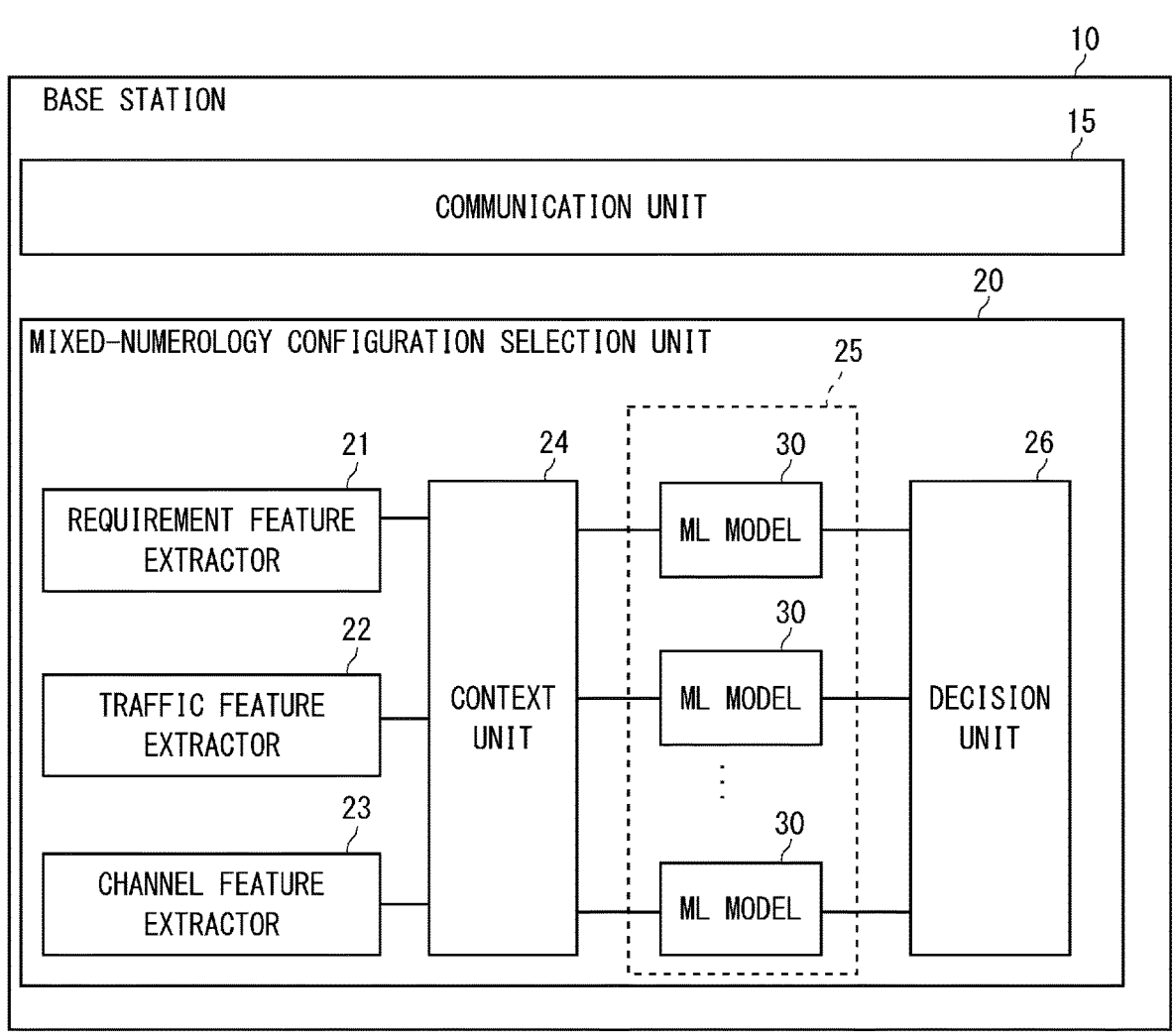
FIG. 1 is a block diagram showing an example of a schematic configuration of a base station according to the present disclosure.

Prior to explain example embodiments of the present disclosure, an outline of the present disclosure will be explained. FIG. 1 shows an example of a schematic configuration of a base station according to the present disclosure. A base station 10 includes a communication unit 15 and a mixed-numerology configuration selection unit 20. The communication unit 15 communicates with a core network and UEs.

The mixed-numerology configuration selection unit 20 is an apparatus for mixed-numerology configuration selection. The mixed-numerology configuration selection unit 20 includes a requirement feature extractor 21, a traffic feature extractor 22, a channel feature extractor 23, a context unit 24, a Machine Learning (ML) model array 25, and a decision unit 26.

The requirement feature extractor 21 extracts statistical features related to service requirements of UEs associated with the base station 10.

The traffic feature extractor 22 extracts statistical features related to incoming and outgoing traffic of the base station 10. The channel feature extractor 23 extracts statistical features related to a wireless channel condition and a wireless channel configuration. The context unit 24 generate a context vector based on the statistical features related to the service requirements, the statistical features related to the incoming and outgoing traffic, and the statistical features related to the wireless channel condition and the wireless channel configuration.

The ML model array 25 includes a plurality of ML models 30. Each of the ML models 30 is configured to estimate QoS for a mixed-numerology configuration based on the context vector generated by the context unit 24. The decision unit 26 selects a mixed-numerology configuration used for data transmission and data reception based on the QoS estimated by the ML models 30.

According to the present disclosure, the requirement feature extractor 21, the traffic feature extractor 22, and the channel feature extractor 23 extract statistical features related to the service requirements, the incoming and outgoing traffic, and the wireless channel condition and the wireless channel configuration. The context unit 24 generates a context vector based on the above statistical features. The ML model array 25 estimates the QoS for mixed numerology configurations using the context vector. In the present disclosure, the ML model array 25 can estimates QoS for the mixed-numerology configurations according to the statistical features of wireless communications between the bases station 10 and UEs. The decision unit 26 uses the QoS estimated by the ML models 30 to select a mixed-numerology configuration, thereby the present disclosure can achieve high QoS for wireless communications with UEs having diverse service requirements without adding any additional overhead.

Hereinafter, example embodiments of the present disclosure will be described in detail with reference to drawings. In the example embodiments, the same or similar elements are denoted by the same symbols and the overlapping descriptions will be omitted.

First Example Embodiment

Figure 2:
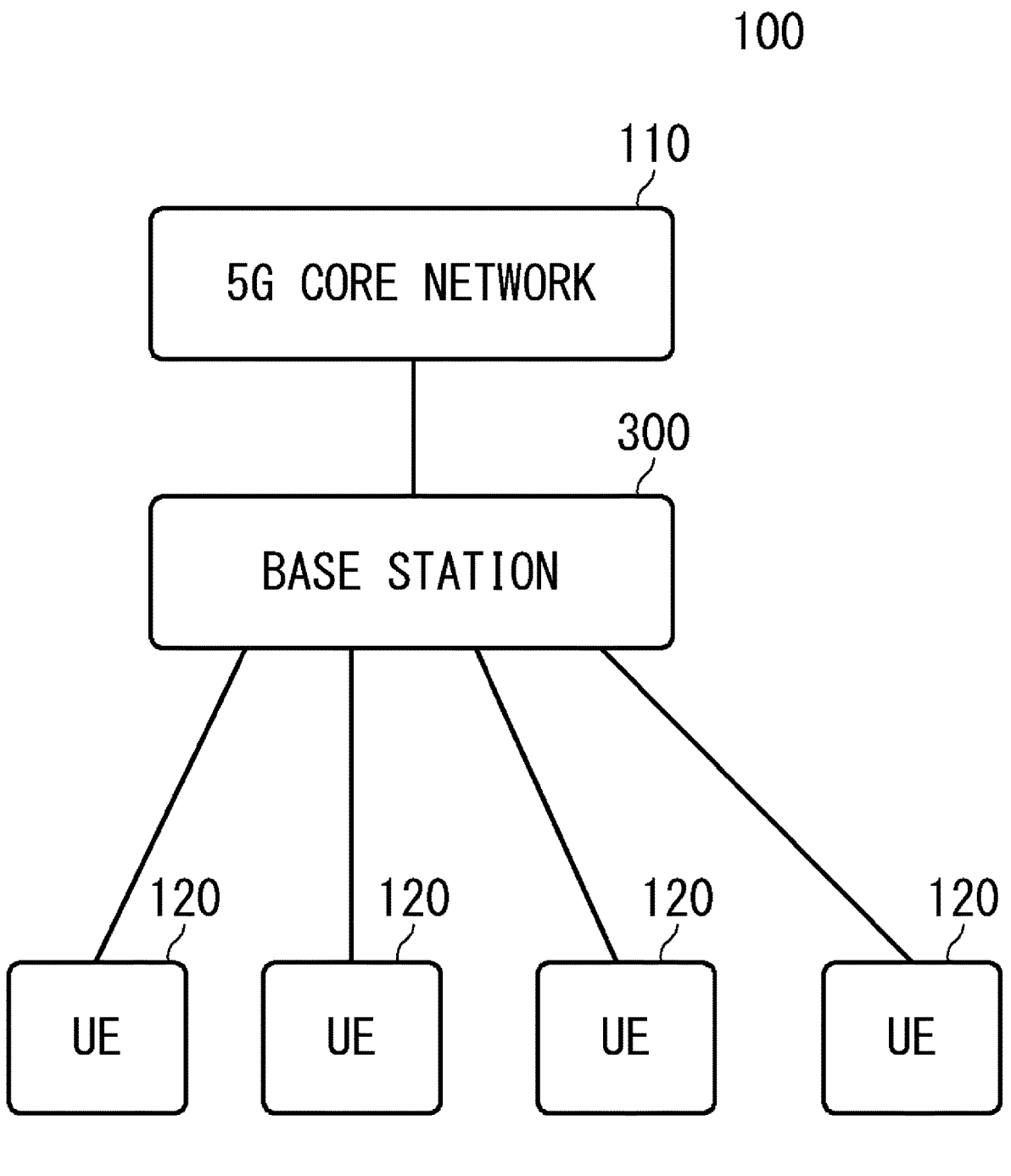
FIG. 2 is a block diagram showing a wireless communication system including a base station according to a first example embodiment of the present disclosure.

FIG. 2 shows a wireless communication system including a base station according to a first example embodiment of the present disclosure. The communication system 100 includes a 5G core network 110, UEs 120, and a base station 300. It is assumed that the base station 300 is a base station in the 5th Generation (5G) wireless communication network. The 5G core network (5GC) 110 is a mobile core network system that accommodates 5G radio. The UEs 120 can communicate with the 5GC 110 via the base station 300. The UEs 120 may have diverse service requirements. The communication system 100 is configured as a mixed-numerology system for accommodating the varied requirements of the UEs 120. The mixed-numerology system is known as a system allowing multiple numerologies to be used simultaneously within the available bandwidth.

Figures 3, 4:
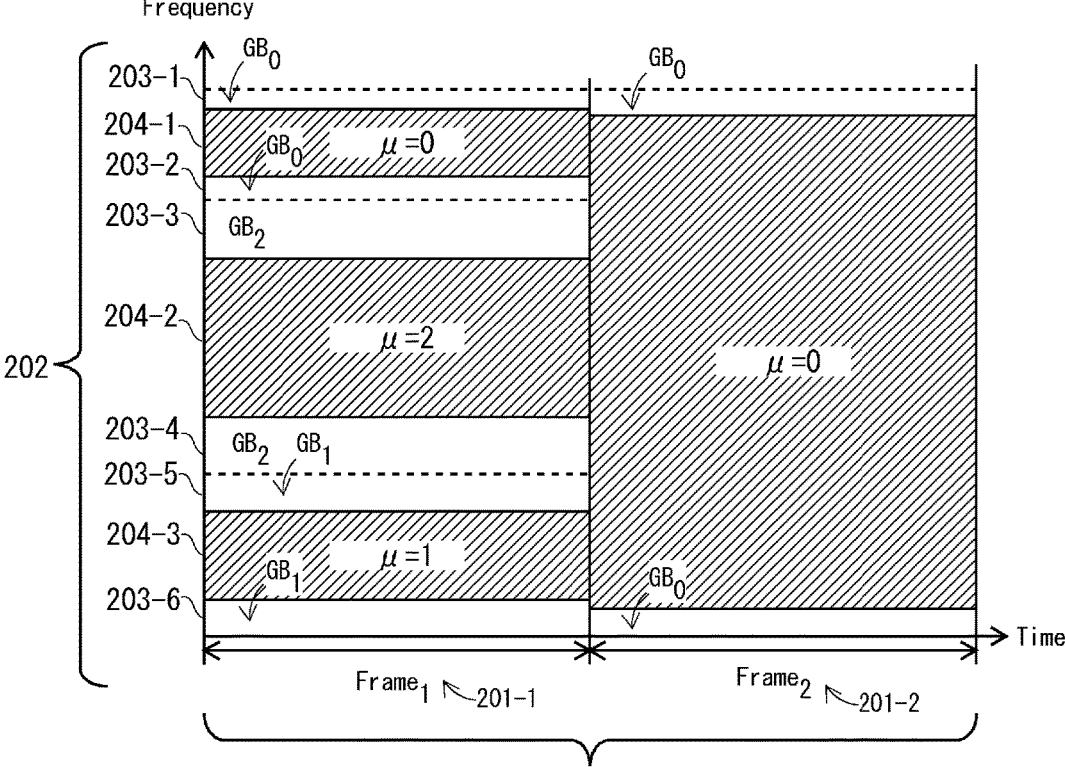
FIG. 3 is a diagram showing a table of different numerologies in different frequency bands as supported by the specification of 5G NR Rel. v15.
FIG. 4 is a diagram showing an example of a channel bandwidth having a mixed-numerology configuration.

FIG. 3 shows a table of numerologies supported in different frequency bands as per the ETSI (European Telecommunications Standards Institute) 5G NR (New Radio) release 15 specifications. Each numerology is identified by a parameter $\mu$ and associated with different channel parameters such as carrier spacing, cyclic prefix duration, slot duration, and the like. FIG. 3 is for illustrative purposes only and is not limited by more numerologies being supported in the future.

FIG. 4 shows an example of a bandwidth. As shown in FIG. 4, a bandwidth 202 is partitioned into different numerology bands 204-1 to 204-3 and guard bands (GB) 203-1 to 203-6 in the data frame 201-1. The ordered tuple of numerology value $\mu$ in numerology bands 204-1 to 204-3 is defined as the mixed-numerology configuration. In the example shown in FIG. 4, the mixed-numerology configuration is (0, 2, 1) in the data $frame_1$ 201-1. The mixed numerology configuration in the data $frame_2$ 201-2 is (0). Note that the numerology bands 204-1 to 204-3 may be also collectively referred to as the numerology bands 204, if it is not necessary to distinguish them. According to the present example embodiment, the value of guard bands 203-1 to 203-6 is determined by the base station 300 (refer to FIG. 2) and doesn't concern itself on how the same is implemented. The value of guard bands can be according to any of the prior art. The mixed-numerology configuration remains unmodified for the duration of a data frame and can be modified at the end of any data frame.

According to the present example embodiment, the mixed-numerology configuration is decided by the base station 300 after the end of each data frame duration as shown in FIG. 4. An object of the present example embodiment is to decide the mixed-numerology configuration for each data frame such that overall QoS is maximized.

Figure 5:
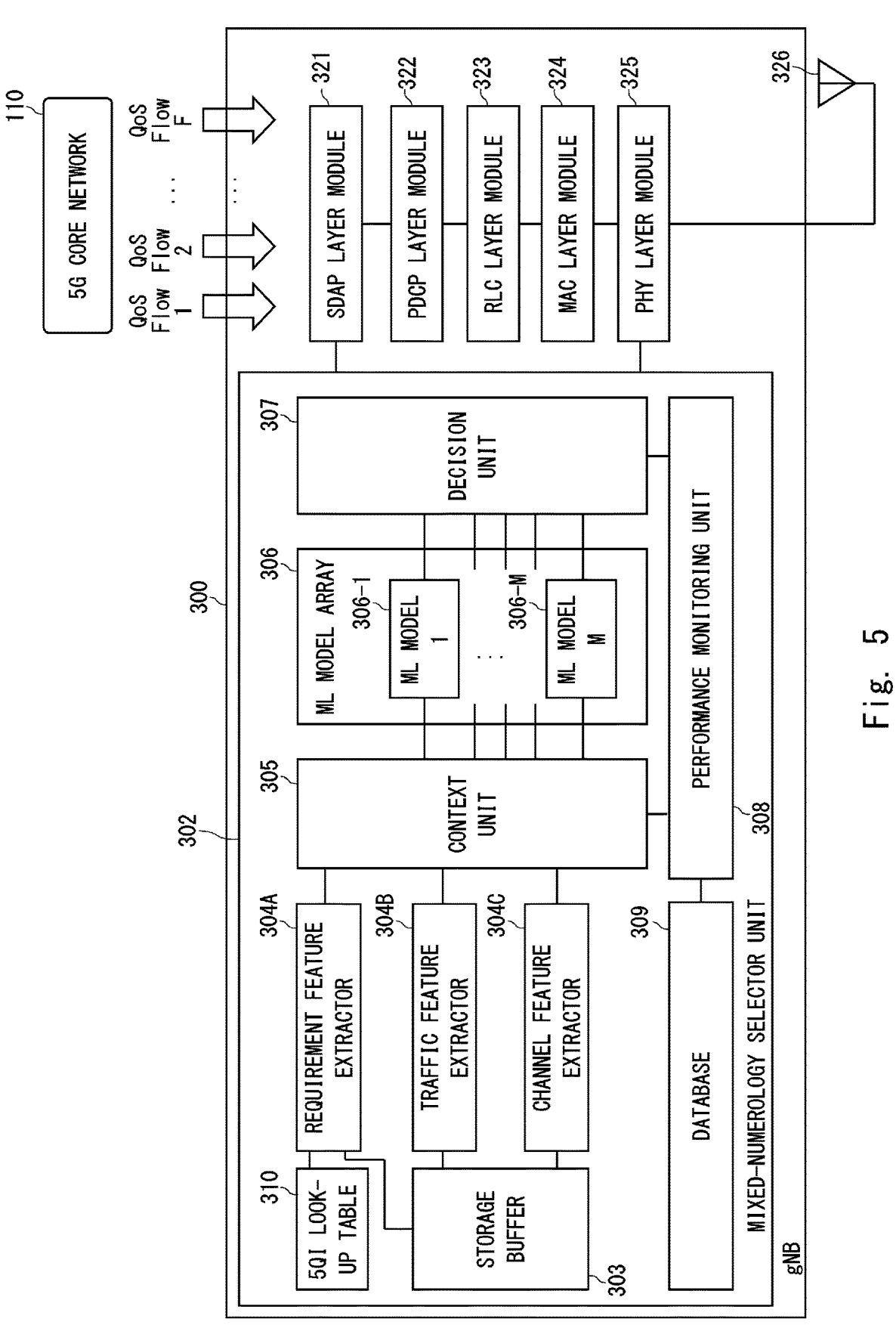
FIG. 5 is a block diagram schematically showing a configuration of a base station according to a first exemplary embodiment of the present disclosure.

FIG. 5 illustrates an exemplary schematic structure of the base station 300 according to the present example embodiment. The base station (gNB) 300 includes a Service Data Adaptation Protocol (SDAP) layer module 321, a Packet Data Convergence Protocol (PDCP) layer module 322, a Radio Link Control (RLC) layer module 323, a Medium Access Control (MAC) layer module 324, a Physical (PHY) layer module 325, a set of antennas (antenna array) 326 and a mixed-numerology selector unit 302. The gNB 300 may be configured as an Orthogonal Frequency Division Multiple Access (OFDMA) base station. The gNB 300 corresponds to the base station 10 shown in FIG. 1.

The SDAP layer module 321 sends data to the PHY layer module 325 via the PDCP layer module 322, the RLC layer module 323 and the MAC layer module 324 during packet transmission. The SDAP layer module 321 receives data the other way around during data reception. The SDAP layer module 321, amongst other things, marks QoS Flow Identifier (QFI) in both downlink and uplink packets. The SDAP layer module 321 periodically sends a 'Start' interrupt signal and thereafter a 'Stop' interrupt signal to the mixed-numerology selector unit 302 to receive back a mixed-numerology configuration in which the gNB 300 should transmit and receive data. The time difference between the start interrupt signal and the stop interrupt signal may be considered to be the system hyper-parameter decided by the network operator/engineer. The operations of the mixed-numerology selector unit 302 are explained later. The PHY layer module 325, amongst other things, shares a Channel Quality Indicator (CQI) report with the mixed-numerology selector unit 302. The SDAP layer module 321, the PDCP layer module 322, the RLC layer module 323 the MAC layer module 324, and the PHY layer module 325 correspond to the communication unit 15 shown in FIG. 1.

According to the present example embodiment, the mixed-numerology selector unit 302 includes a storage buffer 303, a requirement feature extractor 304A, a traffic feature extractor 304B, a channel feature extractor 304C, a context unit 305, a Machine Learning (ML) model array 306, a decision unit 307, a performance monitoring unit 308, a database 309, and a 5G QOS Identifier (5QI) lookup table 310. The mixed-numerology selector unit 302 corresponds to the mixed-numerology configuration selection unit 20 shown in FIG. 1.

The requirement feature extractor 304A extracts statistical features related to service requirements of the UEs 120 associated with the gNB 300. For example, the requirement feature extractor 304A collects service requirements over a certain period of time. The service requirements include, for example, at least one of a delay budget and packet error rate tolerance. The requirement feature extractor 304A computes at least one statistical value of the collected service requirements as the statistical features related to service requirements. The requirement feature extractor 304A corresponds to the requirement feature extractor 21 shown in FIG. 1.

The traffic feature extractor 304B extracts statistical features related to overall incoming and outgoing traffic. For example, the traffic feature extractor 304B collects traffic feature information of data packets over a certain period of time. The traffic feature information includes, for example, at least one of UE ID's (Identifiers), packet size, and a packet arrival time-stamp. The traffic feature extractor 304B computes at least one statistical value, as the statistical features related to overall incoming and outgoing traffic, based on the collected traffic feature information. The traffic feature extractor 304B corresponds to the traffic feature extractor 22 shown in FIG. 1.

The channel feature extractor 304C extracts statistical features related to wireless channel conditions and a wireless channel configuration. For example, the channel feature extractor 304C collets channel feature information over a certain period of time. The channel feature information includes, for example, at least one of the latest available CQI report, the number of available resource blocks, values of guard bands, downlink and uplink share percentages and HARQ (Hybrid Automatic Repeat reQuest) process IDs. The channel feature extractor 304C computes at least one statistical value, as the statistical features related to wireless channel conditions and a wireless channel configuration, based on the collected channel feature information. The channel feature extractor 304C corresponds to the channel feature extractor 23 shown in FIG. 1.

The context unit 305 generates a context vector based on the inputs from the requirement feature extractor 304A, the traffic feature extractor 304B, and the channel feature extractor 304C. The context vector may be a concatenated array of the statistical features related to the service requirement, the statistical features related to the overall incoming and outgoing traffic, and the statistical features related to the wireless channel conditions and the wireless channel configuration. The context unit 305 corresponds to the context unit 24 shown in FIG. 1.

The ML model array (first ML model array) 306 is used to estimates Qos for mixed-numerology configurations. The QoS may be a ratio of the number of QoS flows corresponding to the UEs for which all service requirements are satisfied and the total number of the QoS flows. The ML model array 306 includes M ML models (ML model 1 to ML model M) 306-1 to 306-M. The number of ML models (M) may be the same as the number of possible mixed-numerology configurations. The ML models 306-1 to 306-M are configured to estimate QoS for mixed-numerology configurations 1 to M, respectively. Each of the ML models 306-1 to 306-M is assumed to be pre-trained in an offline manner using either real-world communication data or simulated communication data (synthetic data) generated by a communication network simulation. Note that the ML models 306-1 to 306-M may be also collectively referred to as the ML model array 306, if it is not necessary to distinguish them. The ML model array 306 and the ML models 306-1 to 306-M correspond to the ML model array 25 and the ML models 30 shown in FIG. 1, respectively.

The decision unit 307 selects a mixed-numerology configuration to be used for data transmission and data reception based on the Qos estimated by the ML model array 306. The decision unit 307 may select a mixed-numerology configuration with the highest estimated Qos among the estimation results of the ML model array 306. The decision unit 307 may select a mixed-numerology configuration with the highest estimated when the difference between the QoS estimated for the current mixed-numerology configuration and the highest estimated QoS is greater than a predetermined threshold value. If the difference between the QoS estimated for the current mixed-numerology configuration and the highest estimated QoS is smaller than the threshold value, the decision unit 307 may determine not to change the current mixed-numerology configuration. The decision unit 307 corresponds to the decision unit 26 shown in FIG. 1.

The performance monitoring unit 308 computes an actual QoS obtained for the mixed-numerology configuration selected by the decision unit 307. The database 309 stores labeled context information. The labeled context information may include the context vector, the estimated optimal mixed-numerology configuration, and the corresponding actual QoS. For example, the labeled context information includes tuples of {the Context vector, the selected mixed-numerology configuration, the actual QoS obtained} where the selected mixed-numerology configuration and the actual QoS obtained are referred to as labels. The labeled context information is stored for the purpose of future use (e.g. at least one of offline training of the ML models 306-1 to 306-M and performance analytics of the mixed-numerology selector unit 302). The database may be a fixed size buffer which upon reaching its capacity, deletes the oldest labeled context information to accommodate new labeled context information.

The storage buffer 303 is configured to store partially processed information processed by the requirement feature extractor 304A, the traffic feature extractor 304B, and the channel feature extractor 304C. The 5QI look-up table 310 contains the service requirements corresponding to each of 5QI values (values indicating QoS). FIG. 6 shows an example of the 5QI look-up table 310. The 5QI look-up table 310 maps 5QI values to the service requirements. The service requirement includes, for example, a delay budget and packet error rate tolerance. The requirement feature extractor 304A refers to the 5QI look-up table 310 to extract the service requirements.

Figure 7A:
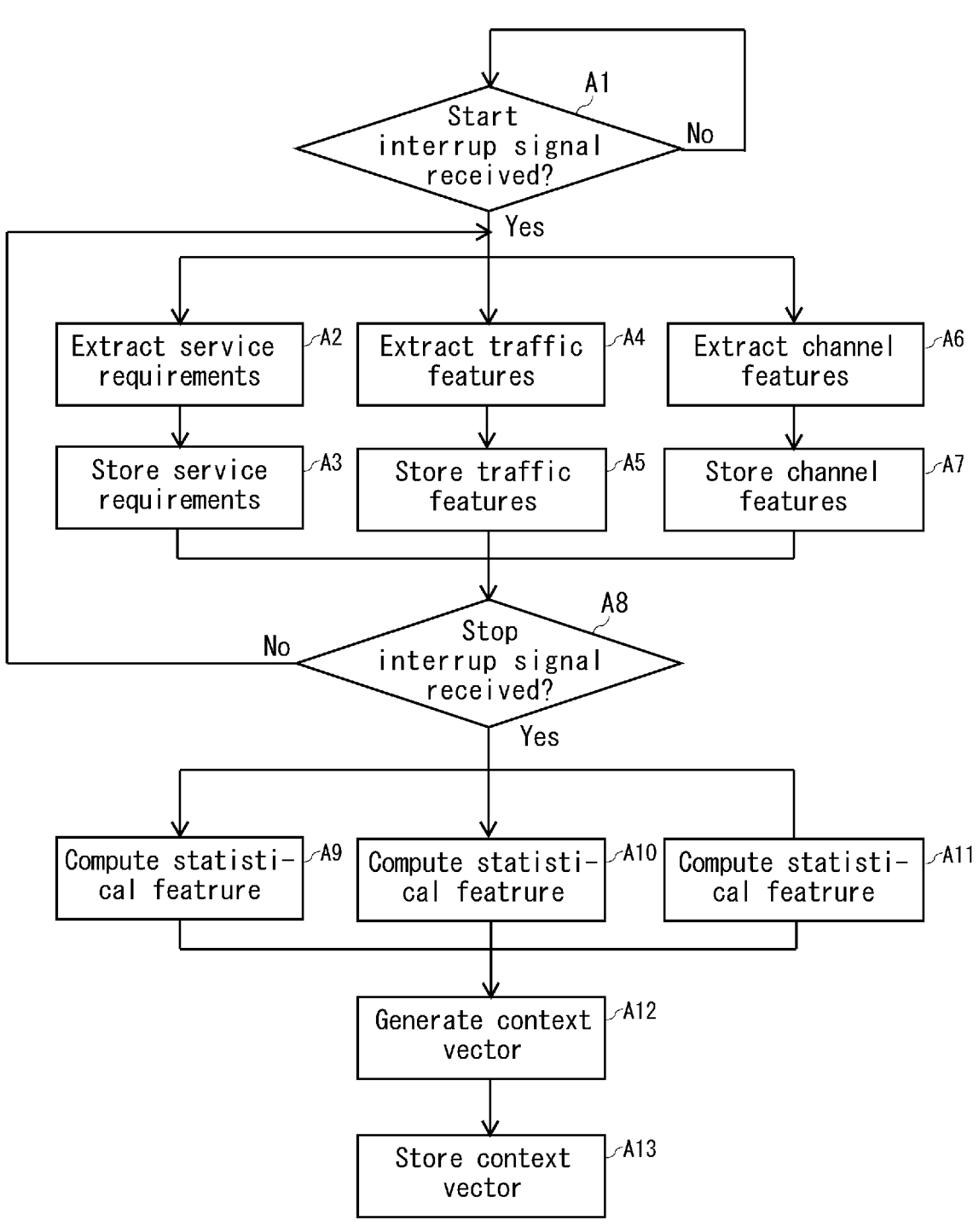
FIG. 7A is a flow chart showing an operation procedure of the context identification phase.

The Operation of Mixed-numerology selector unit 302 (method for mixed-numerology configuration selection) can be divided into the following four phases:
1. Context identification phase
2. QoS estimation phase
3. Mixed-numerology configuration update phase
4. Performance monitoring phase The context identification phase will be explained. FIG. 7A shows an operation procedure of the context identification phase. The mixed-numerology selector unit 302 determines whether or not the start interrupt is received from the SDAP layer module 321 of the gNB 300 (Step A1). When the mixed-numerology selector unit 302 determines that the start interrupt is received, the context identification phase is initiated. If the start interrupt is not received, the mixed-numerology selector unit 302 waits for the start interrupt signal to be received.

In the context identification phase, the requirement feature extractor 304A extracts service requirements of all QoS flows (Step A2). In Step A2, the requirement feature extractor 304A extracts, for example, a 5QI value form the SDAP header in each data packet. Then, the requirement feature extractor 304A refers to the 5QI look-up table 310 to obtain the service requirements corresponding to the extracted 5QI value. The service requirements may include a delay budget and packet error rate tolerance. The requirement feature extractor temporarily stores the service requirement in the storage buffer 303 (Step A3).

The traffic feature extractor 304B extracts traffic feature information (Step A4). The traffic feature information may include UE ID's, packet size, and a packet arrival time-stamp. The traffic feature extractor 304B temporarily stores the extracted information in the storage buffer 303 (Step A5). The channel feature extractor 304C extracts channel feature information (Step A6). The channel feature information may include the latest available CQI report, the number of available resource blocks, values of guard bands, downlink and uplink share percentages and HARQ process IDs. The channel feature extractor 304C temporarily stores the extracted information in the storage buffer 303 (Step A7).

The mixed-numerology selector unit 302 determines whether or not the stop interrupt signal is received from the SDAP layer module 321 (Step A8). Steps A2 to A7 are repeated till it is determined that the stop interrupt signal is received in Step A8. That is, the requirement feature extractor 304A collects and stores the service requirements in Steps A2 and A3 until the stop interrupt signal is received. The traffic feature extractor 304B collects and stores the traffic feature information in Steps A4 and A5 until the stop interrupt signal is received. The channel feature extractor 304C collects and stores the channel feature information in Steps A6 and A7 until the stop interrupt signal is received.

When it is determined that the stop interrupt signal is received in Step A8, the requirement feature extractor 304A computes statistical features from the stored service requirements (Step A9). The statistical features include (but not limited to) mean, minimum, maximum, median and variance of the delay budget and the error rate tolerance. The traffic feature extractor 304B computes statistical features of the data traffic (Step A10). The statistical features include (but not limited to) the number of unique UEs; mean, minimum, maximum, median and variance of the packet size, the packet arrival rate and the antenna power corresponding to the UEs. The channel feature extractor 304C computes statistical features of wireless channels (Step A11). The statistical features include (but not limited to) the total number of resource blocks, and mean, minimum, maximum, median and variance of the CQI, the guard band size, the guard symbols, the downlink and uplink share percentages.

The context unit 305 generates a context vector (Step A12). For example, the context unit 305 concatenates features obtained from the requirement feature extractor 304A, the traffic feature extractor 304B and the channel feature extractor 304C to generate a context vector in Step A12. The context unit 305 stores the generated context vector in the database 309 along with their timestamp (Step A13).

Figure 7B:
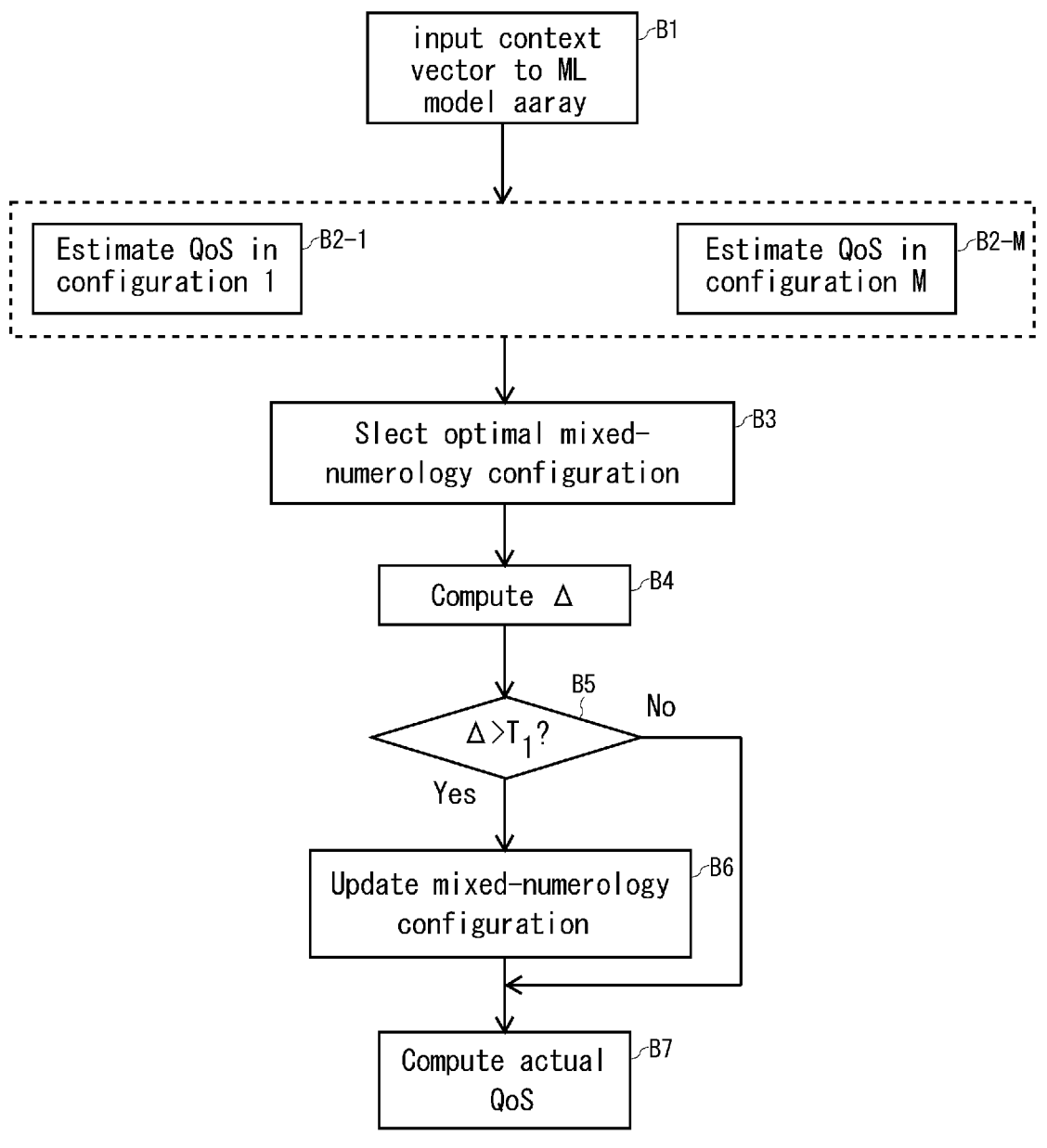
FIG. 7B is a flow chart showing an operation procedure of the QoS estimation phase, the mixed-numerology configuration update phase, and the performance monitoring phase.

Next, the QoS estimation phase, the mixed-numerology configuration update phase and the performance monitoring phase will be explained. FIG. 7B shows an operation procedure of the QoS estimation phase, the mixed-numerology configuration update phase, and the performance monitoring phase. In the QoS estimation phase, the context unit 305 inputs the context vector to each of the ML models 306-1 to 306-M included in the ML model array 306 (Step B1). The ML models 306-1 to 306-M predict or estimate QoS for all possible mixed-numerology configurations (Steps B2-1 to B2-M). Each of the ML model 306-1 to 306-M outputs the estimated QoS for the corresponding mixed-numerology configuration.

In the mixed-numerology configuration update phase, the decision unit 307 selects an optimal mixed-numerology configuration from the possible mixed-numerology configurations based on the estimated Qos (Step B3). The decision unit 307 may select a mixed-numerology configuration with the highest QoS as the optimal mixed-numerology configuration in Step B3. The decision unit 307 computes difference Δ between the estimated QoS in the current mixed-numerology configuration and the optimal mixed-numerology configuration (Step B4). In Step B4, the decision unit 307 may compute difference between the QoS estimated for the current mixed-numerology configuration and the highest QoS among the estimation results of Steps B2-1 to B2-M.

The decision unit 307 determines whether or not the difference Δ computed in Step B4 is greater than a hyperparameter $T_1$ (Step B5). The hyper hyper-parameter $T_1$ is a threshold value for the difference Δ. When it is determined that the difference Δ is greater than the hyper parameter $T_1$ in Step B5, the decision unit 307 selects the optimal mixed-numerology configuration as the mixed-numerology configuration to be used in the SDAP layer module 321. In this case, the decision unit 307 informs the SDAP layer module 321 of the optimal mixed-numerology configuration to update the mixed-numerology configuration in the SDAP layer module 321 (Step B6).

In the performance monitoring phase, the performance monitoring unit 308 computes an actual QoS obtained for the updated mixed-numerology configuration after data transmission (Step B7). The performance monitoring unit 308 may compute a ratio of services for which the service requirements were satisfied and the total number of services as the actual QoS. The performance monitoring unit 308 stores the computed actual QoS in the database 309 along with the updated mixed-numerology configuration. When it is determined that the difference Δ is not greater than the hyper parameter $T_1$ in Step B5, the mixed-numerology configuration in the SDAP layer module 321 is not changed. In this case, the performance monitoring unit 308 computes an actual QoS for the current mixed-numerology configuration in Step B7 and stores the computed actual QoS in the database 309 along with the current mixed-numerology configuration. The mixed-numerology configuration, the actual QoS, and the context vector stored in the database 309 can be used for at least one of offline training of the ML model array 306 and performance analytics of the mixed-numerology selector unit 302.

According to the present example embodiment, the requirement feature extractor 304A, the traffic feature extractor 304B, and the channel feature extractor 304C extract statistical features related to the service requirements, the incoming and outgoing traffic, and the wireless channel condition and the wireless channel configuration. The context unit 305 generates a context vector based on the above statistical features. The ML model array 306 estimates QoS for mixed numerology configurations using the context vector. In the present example embodiment, the ML model array 306 can estimates QoS for the mixed-numerology configurations according to the statistical features of wireless communications between the bases station 300 and UEs 120. The decision unit 307 uses the QoS estimated by the ML model array 306 to select a mixed-numerology configuration. By doing so, the mixed-numerology selector unit 302 can select an optimal mixed-numerology configuration according to the service requirement features, the traffic features, and the channel features, which may vary accompanying with time.

In the present example embodiment, the gNB 300 can dynamically adapts the mixed-numerology configuration according to changing wireless networks autonomously, thereby can achieve high QoS for wireless communications with UEs 120 having diverse service requirements. Further, the gNB 300 according to the present example embodiment can provide a medium access method achieving high overall throughput in a wireless communication system where multiple UEs can access medium simultaneously and in fully distributed fashion. Furthermore, no additional overhead is needed for mixed-numerology selection and the gNB 300 ensures compatibility with standard 802.11 stations with fair medium access opportunity for everyone.

Second Example Embodiment

Figure 8:
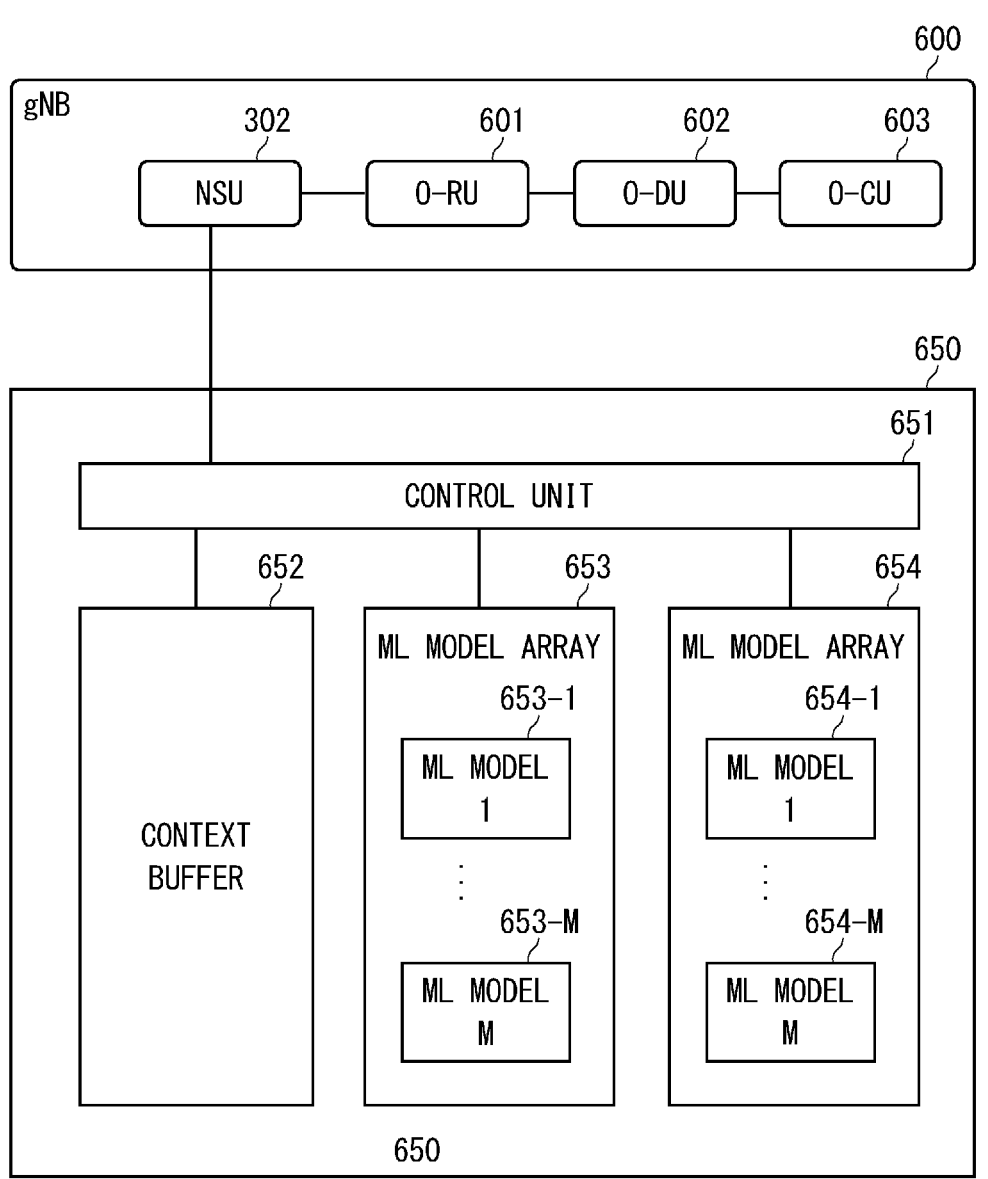
FIG. 8 is a block diagram schematically showing a configuration of a base station according to a second example embodiment of the present disclosure.

Next, a second example embodiment of the present disclosure will be described. FIG. 8 shows a wireless communication system including an apparatus for mixed-numerology selection. The wireless communication system according to the present example embodiment includes a gNB 600 and an ML model updating unit 650. For example, the ML model updating unit 650 is included in a Radio Access Network (RAN) Intelligent Controller (RIC) which controls base station equipment. It should be noted that the 5GC 110 and UEs 120 shown in FIG. 2 are omitted in FIG. 8.

The gNB 600 includes an Open RAN (O-RAN) Radio Unit (O-RU) 601, an O-RAN Distributed unit (O-DU) 602, an O-RAN Central Unit (O-CU) 603 and a mixed-numerology selector unit (NSU) 302. The O-RU 601, the O-DU 602 and the O-CU 603 include the SDAP layer module 321, the PDCP layer module 322, the RLC layer module 323, the MAC layer module 324, the PHY layer module 325, and the set of antennas 326 shown in FIG. 5. The configurations of the O-RU 601, the O-DU 602, and the O-CU 603 may be the same as those of the SDAP layer module 321, the PDCP layer module 322, the RLC layer module 323, the MAC layer module 324, the PHY layer module 325, the set of antennas 326 in the first example embodiment. Further, configurations and operations of the NSU 302 may be the same as those explained in the first example embodiment. In the present example embodiment, the NSU 302 and the ML model updating unit 650 constitute an apparatus for mixed-numerology configuration selection.

In the present example embodiment, the ML model updating unit 650 includes a control unit 651, a context buffer 652, and a pair of an ML model array 653 and an ML model array 654. The control unit 651 fetches labeled context information stored in the database 309 (refer to FIG. 5) of the NSU 302. The labeled context information may include the context vector generated by the context unit 305, the mixed-numerology configuration selected by the decision unit 307, and the Qos computed by the performance monitoring unit 308. The context buffer 652 is a fixed size buffer, and is configured to store the labeled context information. The context buffer 652 may be a First In First Out (FIFO) buffer. It should be noted that the NSU 302 and the ML model updating unit 650 are not necessarily configured as separate devices and may be included in the same device.

The ML model array (second model array) 653 and the ML model array (third ML model array) 654 are used to estimates QoS for mixed-numerology configurations, respectively. The ML model arrays 653 and 654 are configured to replicate the behavior of the ML model array 306 (refer to FIG. 5) in the NSU 302. The ML model array 653 include M ML models (ML model 1 to ML model M) 653-1 to 653-M. The ML model array 654 include M ML models (ML model 1 to ML model M) 654-1 to 654-M. The control unit 651 uses the labeled context information stored in the context buffer 652 and the pair of the ML model arrays 653 and 654 to update the parameters of the ML model array 306 in the NSU 302 according to the wireless network conditions. For example, the control unit 651 updates parameters of the ML model array 654 using the labeled context information. The control unit 651 compares the estimation accuracy of the ML model array 653 and that of the updated ML model array 654. The control unit 651 updates the parameters of the ML model array 306 in the NSU 302 with the parameters of the updated ML model array 654, if the estimation accuracy of the ML model array 654 is higher than that of the ML model array 653.

Figure 9:
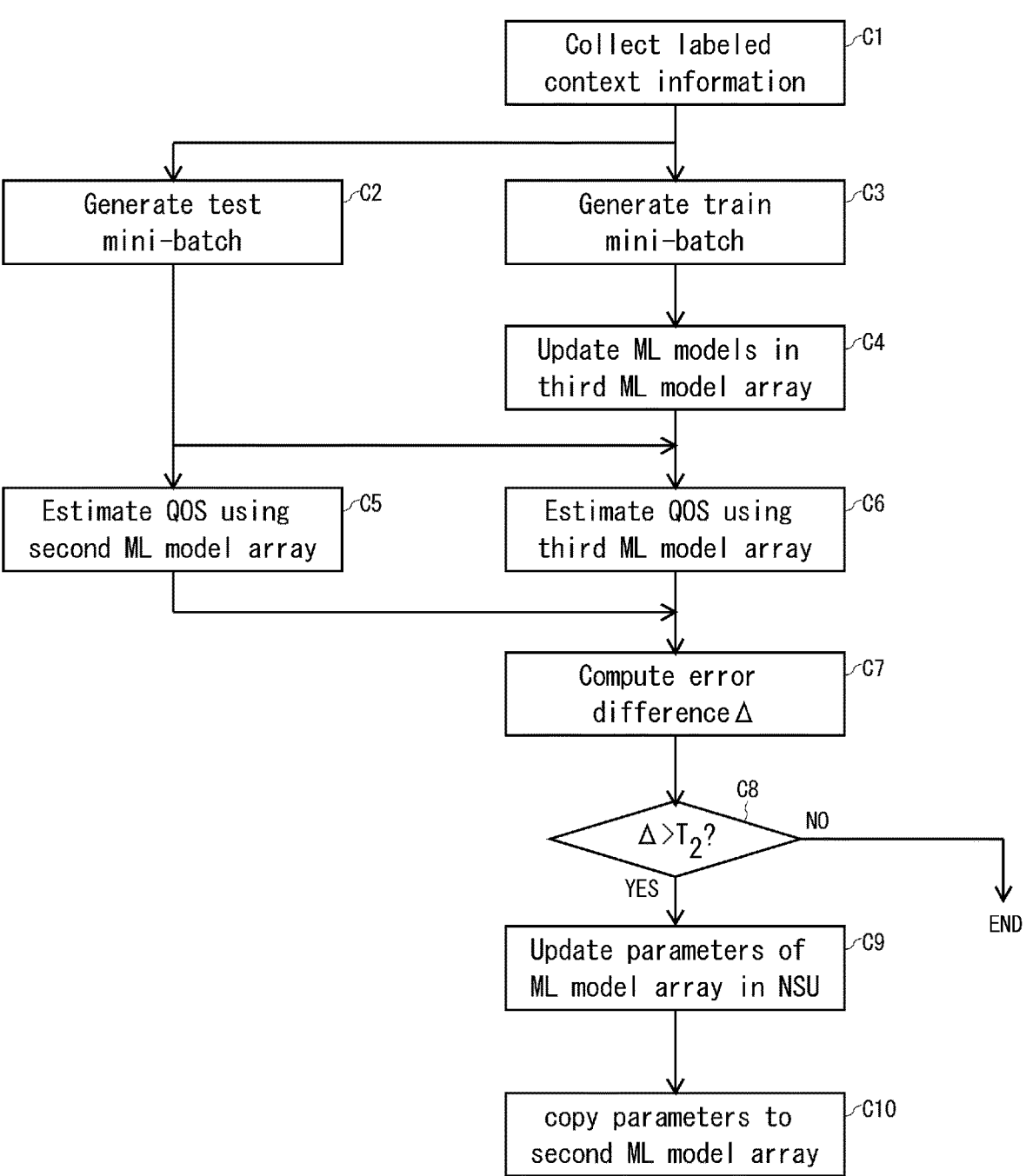
FIG. 9 is a flow chart showing an operation procedure of the ML model updating unit.

The operation procedure of the NSU 302 may be the same as that explained with reference to FIGS. 7A and 7B in the first example embodiment. FIG. 9 shows an operation procedure of the ML model updating unit 650. The control unit 651 periodically fetches labeled context information from the database 309 of the NSU 302 (Step C1). In other words, the control unit 651 collects historic labeled context information from the database 309. In Step C1, the control unit 651 may collect the labeled context information from the database 309 via the standard E2 interface of the Open RAN (O-RAN). The periodicity of fetching data is considered to be a hyper-parameter and can be set according to dynamic nature of the wireless network. The control unit 651 stores the labeled context information in the context buffer 652. The control unit 651 randomly samples the labeled context information to generate two mini-batches of the labeled context information (Steps C2 and C3). The control unit generates a test mini-batch including randomly sampled tuples of the labeled context information in Step C2 and generates a train mini-batch including randomly sampled tuples of the labeled context information in Step C3. Each of the test mini-batch and the train test mini-batch is a randomly sampled subset of the labelled context information stored in the context buffer 652.

The control unit 651 uses the train mini-batch sampled in Step C3 to update the parameters of the ML model array 654 (Step C4). For example, in Step C4, the control unit 651 selects labeled context information, i.e. a tuple in the train mini-batch one by one. The control unit 651 selects a ML model in the ML model array 654 through which QoS is to be predicted according to the selected mixed-numerology configuration included in the selected tuple. The control unit 651 inputs the context vector included in the selected tuple to the selected ML model. The control unit 651 computes an error for the selected mixed-numerology configuration based on the difference between the actual QoS included in the selected tuple and the Qos predicted by the selected ML model. The control unit 651 updates the parameters of the ML model array 654 based on the total error for the mixed-numerology configurations. The total error may be mathematically written as follows:

$$\text{Total error} = \Sigma(\text{Actual QoS} - \text{Predicted Qos})^2$$

Where summation is performed over all of the samples in the train mini-batch. Note that the total error belongs to the entire array and not an individual ML model. The parameters of the ML model array 654 are updated such that the total error is minimized.

It should be noted that the method for updating the parameters of the ML model array 654 is not particularly limited to the above method. Any suitable method for updating the parameters of the ML model array 654 may be used. The algorithm used for updating the parameters of the ML models would depend on the type of the ML models. For example, when the ML models are neural networks based ML models, a stochastic gradient descent algorithm may be used updating the parameters of the ML model array 654.

Consequently, the control unit 651 feeds the test mini-batch sampled in Step C2 to the ML model array 653 and the ML model array 654. The ML model array 653 estimates the QoS for the test mini-batch (Step C5). The ML model array 654, the parameters of which are updated in Step C4, estimates the QoS for the test mini-batch (Step C6).

The control unit 651 computes the error difference Δ for the estimation results of the ML model array 653 and the ML model array 654 (Step C7). In step C7, the control unit 651 may compute the total error for each of the ML model array 653 and the ML model array 654 as described above. The control unit 651 computes the difference between the total errors for the ML model array 653 and the ML model array 654 as the error difference Δ. The error difference Δ may be written as: Error difference Δ=|Total error for the ML model array 653|−|Total error for the ML Model array 654|

If the absolute value of the total error for the ML model array 654 is smaller than the absolute value of the total error for the ML model array 653, that is, if the estimation accuracy of the ML model array 654 is higher than that of the ML model array 653, the error difference Δ indicates a positive value.

The control unit determines whether or not the error difference Δ computed in Step C7 is greater than a hyper-parameter $T_2$, which is a threshold value for the error difference Δ (Step C8). The hyper-parameter $T_2$ may be a positive value. When it is determined that the error difference Δ is greater than the hyper parameter $T_2$ in Step C8, the control unit 651 sends the parameters of the ML model array 654 to the NSU 302 to update the parameters of the ML model array 306 in the NSU 302 (Step C9). Further, the control unit 651 copies the updated parameters of the ML model array 654 onto the ML model array 653 (Step C10). When it is determined that the error difference is not greater than the hyper parameter $T_2$ in Step C8, the parameters of the ML model array 306 in the NSU 302 are not updated.

According to the present example embodiment, the ML model updating unit 650 uses labeled context information and a pair of the ML model arrays 653 and 654 to update the ML model array 306 included in the NSU 302. In the present example embodiment, the parameters of the ML model array 306 in the NSU 302 is updated by the ML model updating unit 650 such that error difference is reduced, thereby estimation accuracy of the QoS in the NSU 302 can be improved. Other effects may be the same as those in the first example embodiment.

It should be noted that, in the above example embodiments, the NSU 302 and the ML model updating unit 650 can be implemented by a device having one or more processors. FIG. 10 shows an example of a configuration of a computer device. A computer device 500 includes at least one processor 510 and at least one memory 520. The memory 520 includes at least one of a volatile memory and a non-volatile memory. The memory 520 stores a software (program) to be executed on the processor 510, for example, in the non-volatile memory. The processor 510 is, for example, a Central Processing Unit (CPU) or the like. The functions of the NSU 302 and the ML model updating unit 650 may be implemented by the processor 510 operating in accordance with the program loaded from the memory 520. The processor 510 may load the program from an external memory of the device 500.

The above program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD (Compact Disc)-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

Although the present disclosure has been described with reference to the embodiments, the present disclosure is not limited to above. Various changes that can be understood by those skilled in the art within the scope of the present disclosure can be made to the configurations and details of the present disclosure.

For example, the whole or some of the embodiments disclosed above can be described as, but not limited to, the following supplementary notes.

(Supplementary Note 1)

An apparatus for mixed-numerology configuration selection, the apparatus including:

a requirement feature extractor configured to extract statistical features related to service requirements of UEs associated with a base station;

a traffic feature extractor configured to extract statistical features related to incoming and outgoing traffic of the base station;

a channel feature extractor configured to extract statistical features related to a wireless channel condition and a wireless channel configuration;

a context unit configured to generate a context vector based on the statistical features related to the service requirements, the statistical features related to the incoming and outgoing traffic, and the statistical features related to the wireless channel condition and the wireless channel configuration;

a first Machine Learning (ML) model array including a plurality of ML Models, each of the ML models being configured to estimate Quality of Service (QOS) for a mixed-numerology configuration based on the context vector generated by the context unit; and a decision unit configured to select a mixed-numerology configuration to be used for data transmission and data reception based on the Qos estimated by the ML models.

(Supplementary Note 2)

The apparatus according to Supplementary Note 1, wherein the context unit is configured to concatenate the statistical features related to the service requirement, the statistical features related to the overall incoming and outgoing traffic, and the statistical features related to the wireless channel condition and the wireless channel configuration to generate the context vector.

(Supplementary Note 3)

The apparatus according to Supplementary Note 1 or 2, wherein the Qos is a ratio of a number of the QoS flows corresponding to the UEs for which all service requirements are satisfied and a total number of the QoS flows.

(Supplementary Note 4)

The apparatus according to any one of Supplementary Notes 1 to 3, wherein each of the ML models included in the first ML model array is pre-trained in an offline fashion using collected real-world data or using synthetic data generated by a communication network simulation.

(Supplementary Note 5)

The apparatus according to any one of Supplementary Notes 1 to 4, wherein the context vector is input to the each of the ML models included in the first ML model array, and the ML models output estimated QoS for mutually different mixed-numerology configurations.

(Supplementary Note 6)

The apparatus according to any one of Supplementary Notes 1 to 5, further including:

a performance monitoring unit configured to compute QoS obtained for the mixed-numerology configuration selected by the decision unit;

a database configured to store the context vector, the selected mixed-numerology configuration and the QoS computed for the selected mixed-numerology configuration as context information; and a ML model updating unit configured to update the ML models included in the first ML model array based on the context information.

(Supplementary Note 7)

The apparatus according to Supplementary Note 6, wherein the ML model updating unit includes;

a pair of a second ML model array and a third ML model array, each of the second ML model array and the third ML model array including a plurality of ML Models each configured to estimate QoS for a mixed-numerology configuration based on the context vector, a control unit configured to obtain the context information from the database and update the ML models included in the first ML model array using the obtained context information, the second ML model array, and the third ML model array.

(Supplementary Note 8)

The apparatus according to Supplementary Note 7, wherein the control unit is configured to:

generate a test mini-batch of the context information and a train mini-batch of the context information;

update parameters of the ML models included in the third ML model array;

input the test mini-batch to the second ML model array and the third ML model array to cause the second ML model array and the third ML model array to estimate the QoS respectively;

compute error difference of the QoS estimated by the second ML model array and error difference of the QoS estimated by the third ML model array;

determine whether to update the ML models included in the first ML model array or not based on the computed error differences;

update, when it is determined to update the ML models included in the first ML model array, the parameters of the ML models included in the first ML model array with the parameters of the ML models included in the third ML model array; and copy the parameters of the ML models included in the third ML model array into the ML models included in the second ML model array.

(Supplementary Note 9)

The apparatus according to any one of Supplementary Notes 1 to 8, wherein the requirement feature extractor is configured to:

extract values each indicating a QoS from data packets;

obtain service requirements corresponding to each of the extracted values using a table mapping the value to service requirements; and compute at least one statistical value of the obtained service requirements as the statistical features related to the service requirements.

(Supplementary Note 10)

The apparatus according to any one of Supplementary Note 1 to 9, wherein the service requirements include at least one of a delay budget and packet error rate tolerance of the QoS flows corresponding to the UEs.

(Supplementary Note 11)

The apparatus according to any one of Supplementary Notes 1 to 10, wherein the traffic feature extractor is configured to:

collect traffic feature information; and compute at least one statistical value based on the collected traffic feature information as the statistical features related to incoming and outgoing traffic.

(Supplementary Note 12)

The apparatus according to Supplementary Note 11, wherein the traffic feature information includes at least one of UE ID's (Identifiers), packet size, and a packet arrival time-stamp.

(Supplementary Note 13)

The apparatus according to any one of Supplementary Notes 1 to 12, wherein the channel feature extractor is configured to:

collect channel feature information; and compute at least one statistical value based on the collected channel feature information as the extract statistical features related to incoming and outgoing traffic.

(Supplementary Note 14)

The apparatus according to Supplementary Note 13, wherein the channel feature information includes at least one of a Channel Quality Indicator (CQI) report, a number of available resource blocks, values of guard bands, downlink and uplink share percentages and Hybrid Automatic Repeat reQuest (HARQ) process identifiers.

(Supplementary Note 15)

The apparatus according to any one of Supplementary Notes 1 to 14, wherein the decision unit is configured to select a mixed-numerology configuration with a highest estimated Qos among the QoS estimated by the ML models included in the first ML model array.

(Supplementary Note 16)

A base station, including:

a communication unit configured to communicate with a core network and UEs, and a mixed-numerology configuration selection unit configured to select a mixed-numerology configuration to be used for data transmission and data reception, wherein the mixed-numerology configuration selection unit includes:

a requirement feature extractor configured to extract statistical features related to service requirements of the UEs:

a traffic feature extractor configured to extract statistical features related to incoming and outgoing traffic of the base station;

a channel feature extractor configured to extract statistical features related to a wireless channel condition and a wireless channel configuration;

a context unit configured to generate a context vector based on the statistical features related to the service requirements, the statistical features related to the incoming and outgoing traffic, and the statistical features related to the wireless channel condition and the wireless channel configuration;

a first Machine Learning (ML) model array including a plurality of ML Models, each of the ML models being configured to estimate Quality of Service (QOS) for a mixed-numerology configuration based on the context vector generated by the context unit; and

a decision unit configured to select a mixed-numerology configuration to be used for data transmission and data reception based on the Qos estimated by the ML models.

(Supplementary Note 17)

The base station according to Supplementary Note 16, wherein the context unit is configured to concatenate the statistical features related to the service requirement, the statistical features related to the overall incoming and outgoing traffic, and the statistical features related to the wireless channel condition and the wireless channel configuration to generate the context vector.

(Supplementary Note 18)

The base station according to Supplementary Note 16 or 17, wherein the QoS is a ratio of a number of the QoS flows corresponding to the UEs for which all service requirements are satisfied and a total number of the QoS flows.

(Supplementary Note 19)

A method for mixed-numerology configuration selection, the method including:

extracting statistical features related to service requirements of UEs associated with a base station, extracting statistical features related to incoming and outgoing traffic of the base station, extracting statistical features related to a wireless channel condition and a wireless channel configuration, generating a context vector based on the statistical features related to the service requirements, the statistical features related to the incoming and outgoing traffic, and the statistical features related to the wireless channel condition and the wireless channel configuration, estimating Quality of Service (QOS) for mixed-numerology configurations based on the context vector using a Machine Learning (ML) model array including a plurality of ML Models, each of the ML models being configured to estimate QoS for a mixed-numerology configuration, and selecting a mixed-numerology configuration to be used for data transmission and data reception based on the QoS estimated by the ML models.

(Supplementary Note 20)

A non-transitory computer readable medium for mixed-numerology configuration selection, the non-transitory computer readable medium stores a program for a causing a computer to:

extract statistical features related to service requirements of UEs associated with a base station, extract statistical features related to incoming and outgoing traffic of the base station, extract statistical features related to a wireless channel condition and a wireless channel configuration, generate a context vector based on the statistical features related to the service requirements, the statistical features related to the incoming and outgoing traffic, and the statistical features related to the wireless channel condition and the wireless channel configuration, input the context vector to a Machine Learning (ML) model array including a plurality of ML Models, each of the ML models being configured to estimate Quality of Service (QOS) for a mixed-numerology configuration, to cause the ML models to estimate the QoS, and select a mixed-numerology configuration to be used for data transmission and data reception based on the QOS estimated by the ML models.

REFERENCE SIGNS LIST

10: BASE STATION
15: COMMUNICATION UNIT

20: MIXED-NUMEROLOGY CONFIGURATION SELECTION UNIT
21: REQUIREMENT FEATURE EXTRACTOR
22: TRAFFIC FEATURE EXTRACTOR
23: CHANNEL FEATURE EXTRACTOR
24: CONTEXT UNIT
25: ML MODEL ARRAY
26: DECISION UNIT
30: ML MODEL
100: COMMUNICATION SYSTEM
110: 5G CORE NETWORK
120: UE
300: BASE STATION (gNB)
302: MIXED-NUMEROLOGY SELECTOR UNIT (NSU)
303: STORAGE BUFFER
304A: REQUIREMENT FEATURE EXTRACTOR
304B: TRAFFIC FEATURE EXTRACTOR
304C: CHANNEL FEATURE EXTRACTOR
305: CONTEXT UNIT
306: ML MODEL ARRAY
306-1 TO 306-M: ML MODELS
307: DECISION UNIT
308: PERFORMANCE MONITORING UNIT
309: DATABASE
310: 5QI LOOK-UP TABLE
321: SDAP LAYER MODULE
322: PDCP LAYER MODULE
323: RLC LAYER MODULE
324: MAC LAYER MODULE
325: PHY LAYER MODULE
326: ANTENNA ARRAY
601: O-RAN RADIO UNIT (O-RU)
602: O-RAN DISTRIBUTED UNIT (O-DU)
603: O-RAN CENTRAL UNIT (O-CU)
650: ML MODEL UPDATING UNIT
651: CONTROL UNIT
652: CONTEXT BUFFER
653, 654: ML MODEL ARRAY

What is claimed is:

1. An apparatus for mixed-numerology configuration selection, the apparatus comprising:

at least one memory storing instructions; and at least one processor configured to execute the instructions to:

extract statistical features related to service requirements of UEs associated with a base station;

extract statistical features related to incoming and outgoing traffic of the base station;

extract statistical features related to a wireless channel condition and a wireless channel configuration;

generate a context vector based on the statistical features related to the service requirements, the statistical features related to the incoming and outgoing traffic, and the statistical features related to the wireless channel condition and the wireless channel configuration;

estimate Quality of Service (QoS) for mixed-numerology configurations based on the generated context vector using a first Machine Learning (ML) model array including a plurality of ML models, each of the ML models being configured to estimate QoS for a mixed-numerology configuration; and select a mixed-numerology configuration to be used for data transmission and data reception based on the QoS estimated by the ML models.

2. The apparatus according to claim 1, wherein the at least one processor is configured to execute the instructions to concatenate the statistical features related to the service requirement, the statistical features related to the overall incoming and outgoing traffic, and the statistical features related to the wireless channel condition and the wireless channel configuration to generate the context vector.

3. The apparatus according to claim 1, wherein the QoS is a ratio of a number of the QoS flows corresponding to the UEs for which all service requirements are satisfied and a total number of the QoS flows.

4. The apparatus according to claim 1, wherein each of the ML models included in the first ML model array is pre-trained in an offline fashion using collected real-world data or using synthetic data generated by a communication network simulation.

5. The apparatus according to claim 1, wherein the context vector is input to the each of the ML models included in the first ML model array, and the ML models output estimated QoS for mutually different mixed-numerology configurations.

6. The apparatus according to claim 1, wherein the at least one processor is further configured to execute the instructions to:

compute QoS obtained for the selected mixed-numerology configuration;

to store, in a database, the context vector, the selected mixed-numerology configuration and the QoS computed for the selected mixed-numerology configuration as context information; and update the ML models included in the first ML model array based on the context information.

7. The apparatus according to claim 6, wherein the at least one processor is configured to execute the instructions to:

obtain the context information from the database and update the ML models included in the first ML model array using the obtained context information, and a pair of a second ML model array and a third ML model array, each of the second ML model array and the third ML model array including a plurality of ML models each configured to estimate QoS for a mixed-numerology configuration based on the context vector.

8. The apparatus according to claim 7, wherein the at least one processor is configured to execute the instructions to:

generate a test mini-batch of the context information and a train mini-batch of the context information;

update parameters of the ML models included in the third ML model array;

input the test mini-batch to the second ML model array and the third ML model array to cause the second ML model array and the third ML model array to estimate the QoS respectively;

compute error difference of the QoS estimated by the second ML model array and error difference of the QoS estimated by the third ML model array;

determine whether to update the ML models included in the first ML model array or not based on the computed error differences;

update, when it is determined to update the ML models included in the first ML model array, the parameters of the ML models included in the first ML model array with the parameters of the ML models included in the third ML model array; and copy the parameters of the ML models included in the third ML model array into the ML models included in the second ML model array.

9. The apparatus according to claim 1, wherein the at least one processor is configured to execute the instructions to:

extract values each indicating a QoS from data packets;

obtain service requirements corresponding to each of the extracted values using a table mapping the value to service requirements; and compute at least one statistical value of the obtained service requirements as the statistical features related to the service requirements.

10. The apparatus according to claim 1, wherein the service requirements include at least one of a delay budget and packet error rate tolerance of the QoS flows corresponding to the UEs.

11. The apparatus according to claim 1, wherein the at least one processor is configured to execute the instructions to:

collect traffic feature information; and compute at least one statistical value based on the collected traffic feature information as the statistical features related to incoming and outgoing traffic.

12. The apparatus according to claim 11, wherein the traffic feature information includes at least one of UE ID's (Identifiers), packet size, and a packet arrival time-stamp.

13. The apparatus according to claim 1, wherein the at least one processor is configured to execute the instructions to:

collect channel feature information; and compute at least one statistical value based on the collected channel feature information as the statistical features related to incoming and outgoing traffic.

14. The apparatus according to claim 13, wherein the channel feature information includes at least one of a Channel Quality Indicator (CQI) report, a number of available resource blocks, values of guard bands, downlink and uplink share percentages and Hybrid Automatic Repeat reQuest (HARQ) process identifiers.

15. The apparatus according to claim 1, wherein the at least one processor is configured to execute the instructions to select a mixed-numerology configuration with a highest estimated QoS among the QoS estimated by the ML models included in the first ML model array.

16. A base station, comprising:

a communication apparatus configured to communicate with a core network and UEs, and the mixed-numerology configuration selection apparatus according to claim 1.

17. The base station according to claim 16, wherein the at least one processor is configured the instructions to concatenate the statistical features related to the service requirement, the statistical features related to the overall incoming and outgoing traffic, and the statistical features related to the wireless channel condition and the wireless channel configuration to generate the context vector.

18. The base station according to claim 16, wherein the QoS is a ratio of a number of the QoS flows corresponding to the UEs for which all service requirements are satisfied and a total number of the QoS flows.

19. A method for mixed-numerology configuration selection, the method comprising:

extracting statistical features related to service requirements of UEs associated with a base station, extracting statistical features related to incoming and outgoing traffic of the base station, extracting statistical features related to a wireless channel condition and a wireless channel configuration, generating a context vector based on the statistical features related to the service requirements, the statistical features related to the incoming and outgoing traffic, and the statistical features related to the wireless channel condition and the wireless channel configuration, estimating Quality of Service (QoS) for mixed-numerology configurations based on the context vector using a Machine Learning (ML) model array including a plurality of ML models, each of the ML models being configured to estimate QoS for a mixed-numerology configuration, and selecting a mixed-numerology configuration to be used for data transmission and data reception based on the QoS estimated by the ML models.

20. A non-transitory computer readable medium for mixed-numerology configuration selection, the non-transitory computer readable medium stores a program for a causing a computer to:

extract statistical features related to service requirements of UEs associated with a base station, extract statistical features related to incoming and outgoing traffic of the base station, extract statistical features related to a wireless channel condition and a wireless channel configuration, generate a context vector based on the statistical features related to the service requirements, the statistical features related to the incoming and outgoing traffic, and the statistical features related to the wireless channel condition and the wireless channel configuration, input the context vector to a Machine Learning (ML) model array including a plurality of ML models, each of the ML models being configured to estimate Quality of Service (QoS) for a mixed-numerology configuration, to cause the ML models to estimate the QoS, and select a mixed-numerology configuration to be used for data transmission and data reception based on the QoS estimated by the ML models.

* * * * *